(12) United States Patent
Ho

(10) Patent No.: US 9,123,066 B2
(45) Date of Patent: Sep. 1, 2015

(54) PRE-AUTHENTICATED ONLINE ORDERING SYSTEM

(75) Inventor: Yuan Der Ho, San Mateo, CA (US)

(73) Assignee: eBay, Inc., San Jose, CA (US)

( * ) Notice: Subject to any disclaimer, the term of this patent is extended or adjusted under 35 U.S.C. 154(b) by 1145 days.

(21) Appl. No.: 12/136,675

(22) Filed: Jun. 10, 2008

(65) Prior Publication Data

US 2009/0307101 A1    Dec. 10, 2009

(51) Int. Cl.
  *G06Q 30/00* (2012.01)
  *G06Q 30/06* (2012.01)
(52) U.S. Cl.
  CPC ........ *G06Q 30/0603* (2013.01); *G06Q 30/0601* (2013.01)
(58) Field of Classification Search
  CPC .................................................... G06Q 30/00
  USPC ........................................... 705/26, 27, 26.1
  See application file for complete search history.

(56) References Cited

U.S. PATENT DOCUMENTS

| 2005/0010486 A1* | 1/2005 | Pandhe ........................... 705/26 |
| 2005/0044224 A1* | 2/2005 | Jun et al. ....................... 709/225 |
| 2010/0312664 A1* | 12/2010 | Roseman et al. ............ 705/26.3 |

\* cited by examiner

*Primary Examiner* — Mila Airapetian
(74) *Attorney, Agent, or Firm* — Schwegman Lundberg & Woessner, P.A.

(57) ABSTRACT

A computerized method and system for pre-authenticated online ordering are provided. Example embodiments may include receiving a set of user authentication credentials sufficient to uniquely identify a registered user. A selection of an item from a number of items may be received from the registered user. A unique address may be provided to the registered user. The unique address may be associated with a simplified user interface that allows users of the unique address to perform limited sets of operations associated with the item.

29 Claims, 12 Drawing Sheets

PRE-AUTHENTICATED ONLINE ORDERING SYSTEM

TECHNICAL FIELD

Example embodiments relate generally to the technical field of data management, and in one specific example, to a system and a method for pre-authenticated online ordering.

BACKGROUND

More and more, Internet users are realizing the ease and convenience of searching online for a variety of needed goods and services. The convenience factor, identified by researches as a fundamental objective of online shopping, may include the overall ease of finding a product or a service and minimization of the shopping effort and time. Furthermore, online shopping allows consumers to shop in the convenience of their home and at times that many stores and shopping malls may be closed for business.

Online shopping may benefit both individuals and society as a whole. From society's point of view, saving on resources such as human and natural resources would be a great benefit. Online shoppers may freely browse online themselves rather than asking for assistance from vendors. The fact that online shopping saves shoppers from traveling to vendor places also helps in saving energy and conserving the environment. In addition, online shoppers are free from the pressure to buy from the vendors and may spend more time in making wise purchase decisions. Availability of almost unlimited varieties of products and services to online shoppers is another benefit of online shopping. Online shoppers may also benefit from the online auctions provided by online commerce systems such as EBAY INC. of San Jose, Calif.

BRIEF DESCRIPTION OF THE DRAWINGS

Some embodiments are illustrated by way of example and not limitation in the figures of the accompanying drawings in which.

DETAILED DESCRIPTION

Example methods and systems for pre-authenticated online ordering will be described. In the following description, for purposes of explanation, numerous specific details are set forth in order to provide a thorough understanding of example embodiments. However, it will be evident to one skilled in the art that the present technology may be practiced without these specific details.

Some example embodiments described herein may include receiving a set of user authentication credentials (e.g., username and password or bio-credentials, etc.) sufficient to uniquely identify a registered user (e.g., a user registered with an online commerce system, such as EBAY INC., of San Jose, Calif.; an online business; or a publication system, such as KIJIJI.COM, a subsidiary of EBAY INC., etc.). A selection of an item (e.g., listing of a product or a service) from a number of items may be received from the registered user. A unique address (e.g., a Unique Resource Locator (URL) or widget) may be provided to the registered user. This unique address may be associated with a simplified user interface that allows users of the unique address to perform limited sets of operations associated with the item.

Example embodiments may include receiving a response from a user. The user may be the registered user or a third person who has received the URL from the registered user. The response may be retrieved from the user interface and may include an instruction specifying the limited sets of operations. For example, the instruction may include a bidding price, a max price, a quantity, and a date and time for bidding on the item selected from the listings of an online commerce system (e.g., sniping the item by having the server place a bid for the item a few seconds before the auction end time for the item). The instruction may also include a purchase order for purchasing one or more products or services from an entity (e.g., a business entity, such as an online business including an online store, an online mall, etc.) at a predetermined price (e.g., a price specified in a catalogue, brochure, webpage, flyer, or quoted using any other method).

The instruction received from the user may, in an example embodiment, be executed by the online auction system or the online business. The execution of the instruction may be based on the previous user authentication of the registered user. In other words, the user may not have to be authenticated at every incidence of using the URL. In cases where the instruction includes a bidding price for the item, the online auction system may place the bid on behalf of the user. Instructions including a purchase order may cause the online business to perfect the purchase order and charge the user for the predetermined price.

Figure 1:
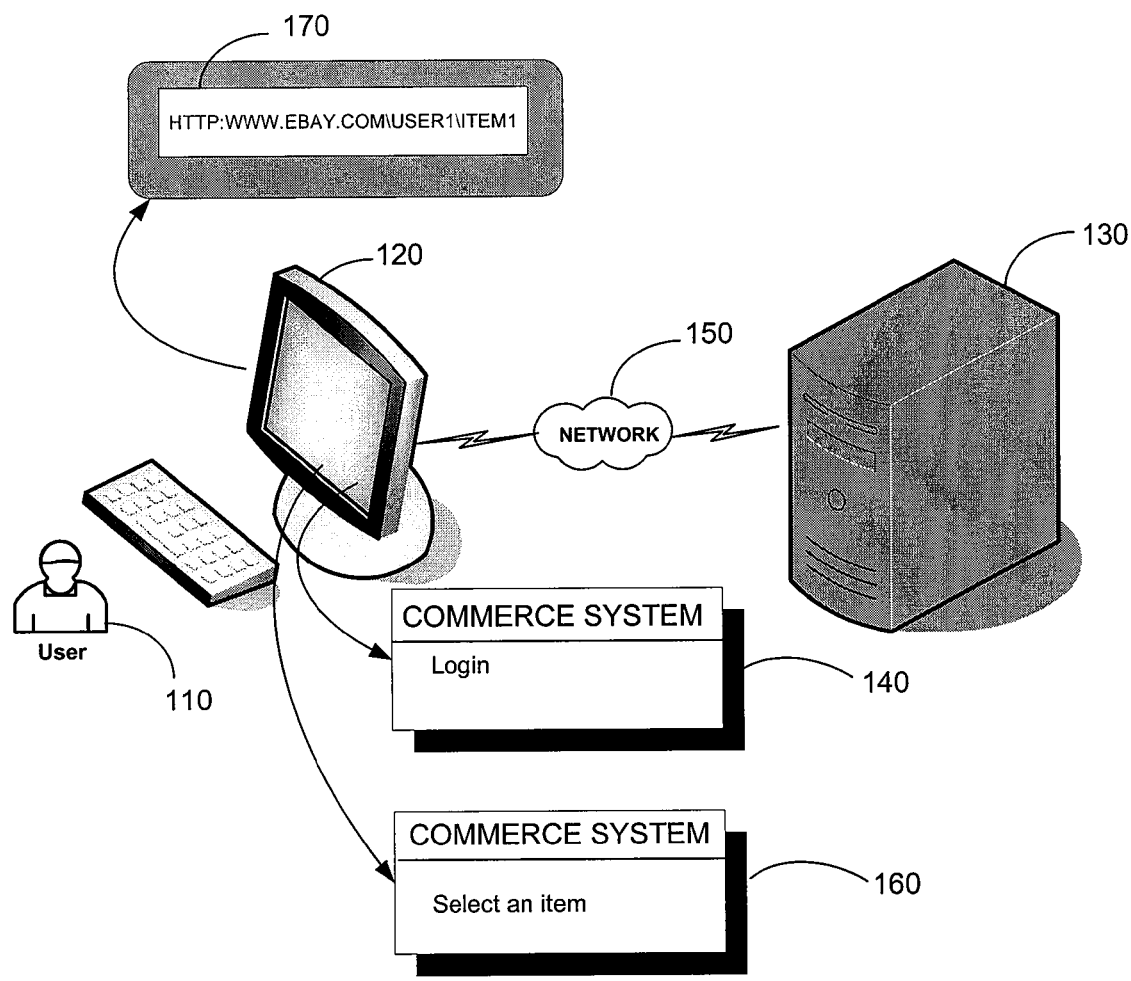
FIG. 1 is a high-level diagram depicting, in an example embodiment, functionality of a system for pre-authenticated online ordering.

FIG. 1 is a high-level diagram depicting, in an example embodiment, functionality of a system for pre-authenticated online ordering. A server 130 of an online business may receive authentication credentials sufficient to identify a registered user. The online business may include an online commerce system, an online store, an online mall, etc. The authentication credentials may include a user name and password entered by the registered user into a user interface 140 using a client system 120. The client system 120 may be linked to the server 130 via a network 150 (e.g., the Internet or a Local Area Network (LAN), etc.). In alternative example embodiments, the authentication credentials may include bio-credentials or any other type of authentication credentials that may be incorporated into an online authentication system.

The server 130 may present, via a user interface 160, a number of items listed with the commerce system. The registered user may select an item from the number of items presented. The item may be a product or a service provided by the online business. In response to receiving the selection, the server 130 may provide the registered user with a unique address 170 (e.g., a URL or a widget) associated with a simplified user interface that allows the registered user to perform a limited number of operations with the item. In an example embodiment, the registered user may release the unique address to a third person for use by the third person. The operations may include bidding on the item or purchasing the item. In an example embodiment, the simple user interface may allow the user 110 (e.g., the registered user or the third person) to select one or more options from a list of options provided by the simplified user interface. The options, for example, may include, but are not limited to, a bid price, a bid time, a max price, or a purchase price for the item.

Example embodiments may include receiving a response from the user using the unique address. The response may include an instruction. The instruction may include a bidding price, a max price, a quantity, and a date and time for bidding on the item selected form the listings of an online commerce system. The instruction may also include a purchase order for purchasing one or more products or services from an entity (e.g., a business entity, such as an online business including an online store, an online mall, etc.) at a predetermined price (e.g., a price specified in a catalogue, brochure, webpage, flyer, or quoted in any other method). The server 130 may execute the instruction by bidding for the item, purchasing the item, or ordering the service on behalf of the user 110.

Figure 2:
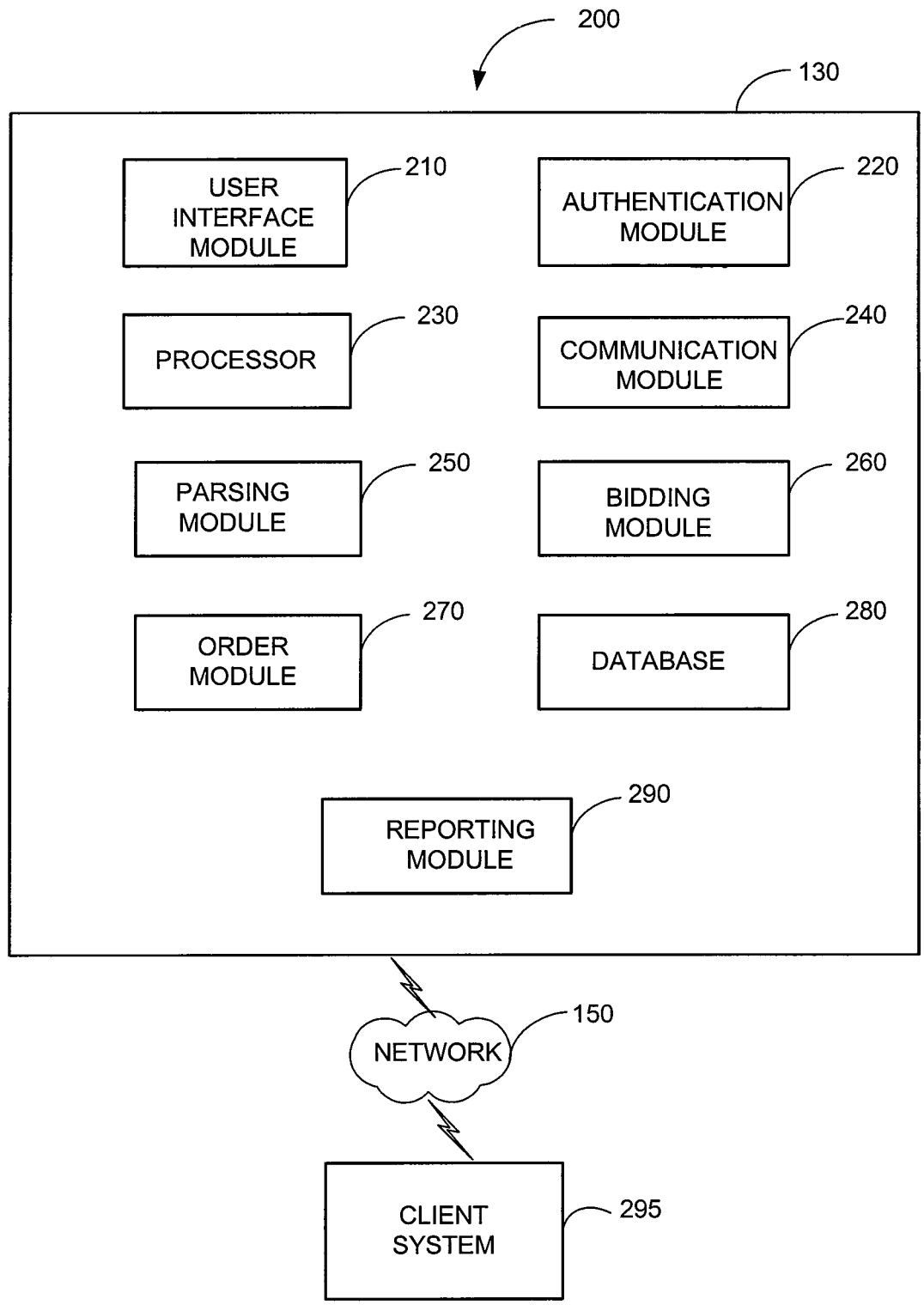
FIG. 2 is a block diagram illustrating an example embodiment of a system for pre-authenticated online ordering.

FIG. 2 is a block diagram illustrating an example embodiment of a system 200 for pre-authenticated online ordering. The system 200 may include a server 130 and a client system 295. The server 130 may include a user interface module 210, an authentication module 220, a processor 230, a communication module 240, a parsing module 250, a bidding module 260, an order module 270, a database 280, and a reporting module 290. The server 130 may be linked to the client system 295 via the network 150.

T the user interface module 210 may receive a set of user authentication credentials sufficient to uniquely identify a registered user of a business entity. In example embodiments, the business entity may include, but is not limited to, an online commerce system, an online business, or a publication system. The authentication credential may include a username and password or a set of bio-credentials. The authentication module 220 may verify the authentication credentials received from the user. The authentication module 220 may use technologies well known in the art to perform the verification. The authentication module 220 may match the authentication credential received from the registered user with information stored in the database 280.

According to example embodiments, the user interface module 210 may receive from the registered user a selection of an item from a list of a number of items. The user interface module 210 may present the list of items via a user interface to the registered user. The items may include listings in an online commerce system in an auction or Buy It Now (BIN) format, or products or services offered for sale in an online store or online mall.

Responsive to the receiving of the selection, the processor 230 may generate a unique address (e.g. a URL, a widget, etc.). The unique address, for example, may be associated with a simple user interface generated by the user interface module 210. The communication module 240 may communicate the unique address to the registered user. The communication module 240 may communicate the unique address via email, short message service (SMS), voice mail, fax, or any other electronic messaging system.

The registered user may release the unique address to a third person. For example, the registered user may give the URL to the third person as a gift. The item may be a gift item available from an online store. The simple user interface may allow a user 110 (e.g., the registered user or the third person) to perform a limited set of operations associated with the item. The operations may include bidding on the item or purchasing the item. The user 110 may not have to authenticate in every instance of using the unique address. In other words, the operations performed by the user 110 are assumed to be approved by the registered user who has been authenticated before issuance of the URL. Accordingly, an important benefit of the technology presented in this application is that the technology would allow pre-authenticated ordering of the item for which the unique address has been issued.

In example embodiments, the simple user interface may allow the user 110 to select one or more options from a list of options provided by the simplified user interface. The options may include, but are not limited to, a bid price, a bidding time, a max price, or a purchase price for the item. The user interface module 210 may receive a response form the user. The response may include an instruction. The parsing module 250 may parse the response to retrieve the instruction from the response. The instruction may be related to bidding in an online commerce system and include a bidding price, a max price, a quantity, and a date and time for bidding on the item.

The instruction may, for example, be related to a purchase order for purchasing one or more products or services from an entity at a predetermined price. The entity may include, but is not limited to, a business entity such as an online business, including an online store or an online mall. The predetermined price may be a price specified in a catalogue, brochure, webpage, flyer, or quoted using any other method.

After receiving the instruction, in a case where the instruction is related to bidding in an auction, the bidding module 260 may place a bid for the item in the online commerce system on behalf of the user. The bidding module 260 may use the instruction related to the bidding, including the bidding price and the quantity, in bidding for the item. The bidding module 260 may also place the bid at the date and time specified in the instruction. The bidding module 260 may increase the bidding price to a max price determined by the instruction depending on competing bid prices.

When the instruction related to a purchase order is received by the user interface module 210, the order module 270 may execute the instruction. The order module 270 may purchase the product or order the service on behalf of the user. The order module 270 may make the purchase based on the quantity indicated in the instruction. The order module 270 may charge an account associated with the registered user to pay for the product or the service.

An example embodiment may include reporting, by the reporting module 290, of a result to the user. The result may include a status report on activities of the bidding module 260 or the order module 270. The status report may include information related to the bidding. For example, the status report may indicate whether the user was a winner and what the winning price was. The status report may include information regarding the purchasing of the product or ordering of the service. For example, the report may show a delivery date and time for the product or the service and may include a receipt for the purchase of the product or the order of the service.

Figure 3:
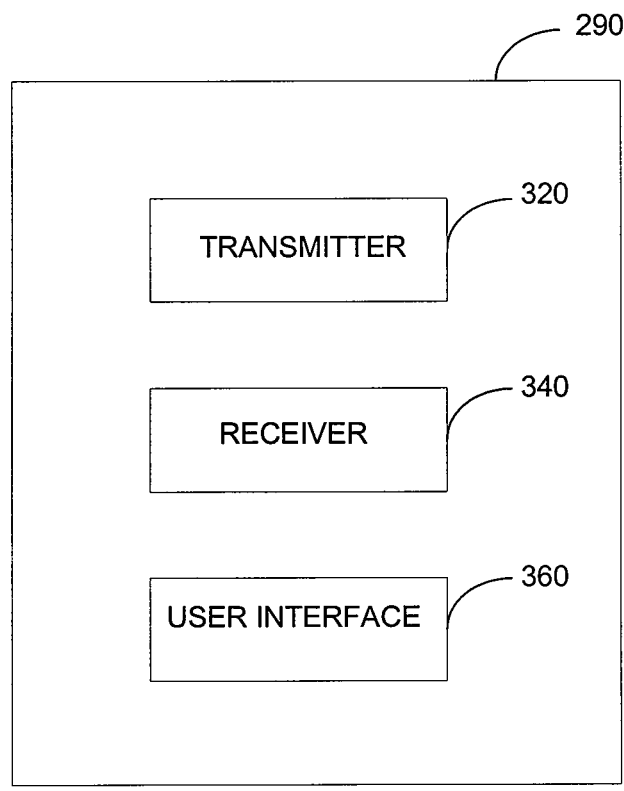
FIG. 3 is a block diagram illustrating, in an example embodiment, components of the client system shown in FIG. 2.

FIG. 3 is a block diagram illustrating, in an example embodiment, components of the client system 120 shown in FIG. 2. The client system 120 may include a transmitter 320, a receiver 340, and a user interface 360. The transmitter 320 may transmit a set of user authentication credentials sufficient to uniquely identify a registered user to the server 130. The transmitter 320 may include a modem operable to communicate via the network 150. The transmitter 320 may transmit to the server 130 a selection of an item from a list of a number of items. The items may be a product or a service provided by a business entity. The business entity may include, but not be limited to, an online commerce system, an online business, or a publication system. The selection may be made by a registered user of the business entity.

In response to transmitting the selection, the receiver may receive a unique address associated with a simplified user interface. The user interface 360 may present the unique address to the registered user. The user interface 360 may allow a user of said unique address to perform a limited set of operations associated with said item.

According to example embodiments, the user of the unique address may be the registered user or a third person receiving the unique address from the registered user. The operations may include bidding on the item or purchasing the item. In an example embodiment, the simple user interface may allow a user (e.g., the registered user or the third person) to select one or more options from a list of options provided by the simplified user interface. The options, for example, may include, but are not limited to, a bid price, a bid time, a max price, or a purchase price for the item.

The transmitter 320 may transmit a response from the user to the server 130. The response may include an instruction specifying the limited set of operations. The instruction may include a bidding price for the item (e.g., a listing in an online commerce system), a purchase order for purchasing the item (e.g., a product or a service) from an entity (e.g., an online business entity) at a predetermined price, a quantity (e.g. a quantity of the item to bid on or to be purchased), etc.

Figure 4:
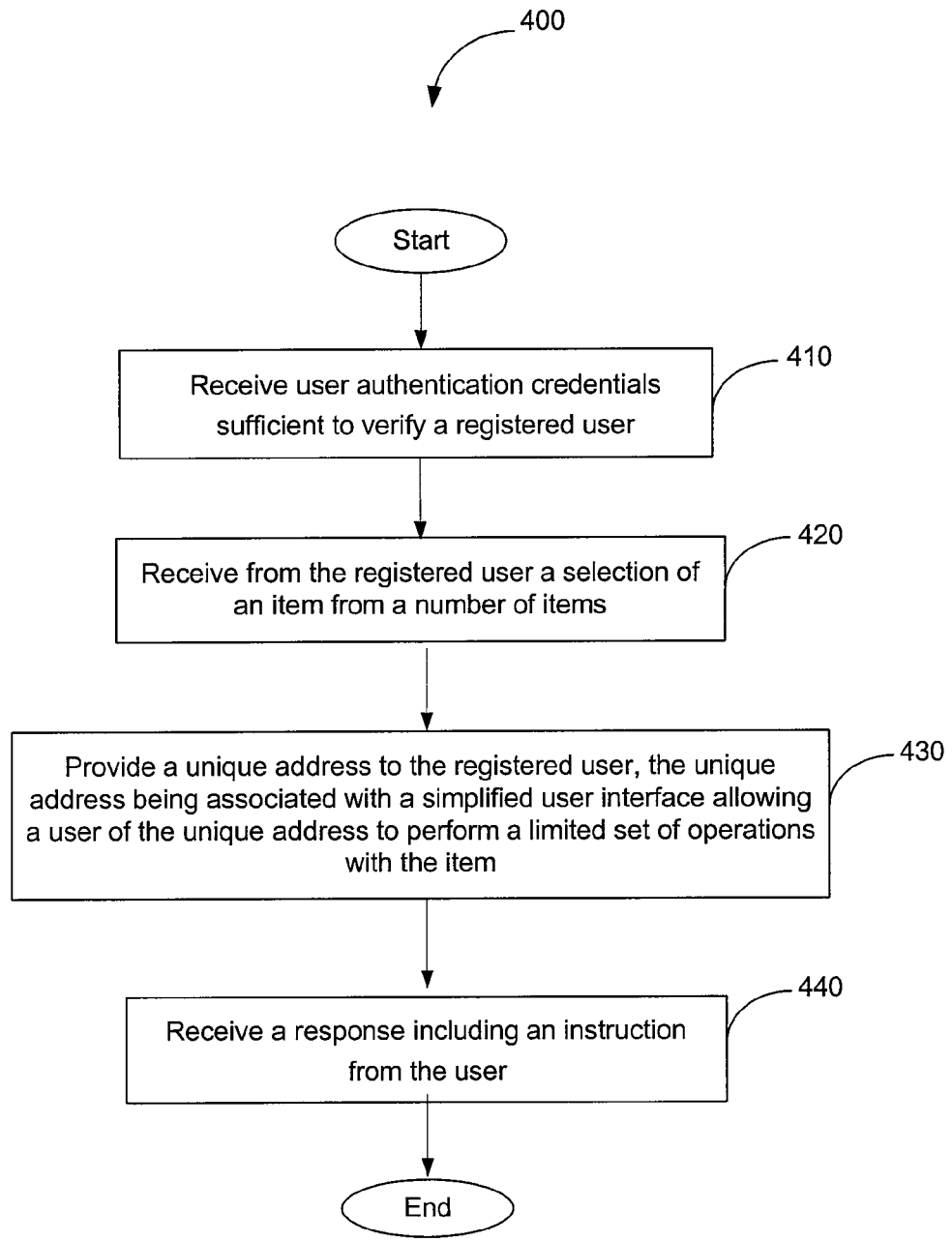
FIG. 4 is a high-level flow diagram illustrating an example method for pre-authenticated online ordering using the server of FIG. 1.

FIG. 4 is a high-level flow diagram illustrating an example method 400 for pre-authenticated online ordering using the server of FIG. 1. The method starts at operation 410, where the user interface module 210 may receive user authentication credentials sufficient to verify a registered user of an online business entity. At operation 420, the user interface module 210 may receive from the registered user a selection of an item from a list of a number of items offered by the business entity. The processor 230 may generate a unique address associated with the item at operation 430. The unique address may allow a user of the unique address to perform a limited number of operations with the item. The user may be the registered user or a third person who received the unique address from the registered user.

In some example embodiments, the communication module 240 may communicate the unique address to the registered user. The registered user may then release the unique address to the third person. At operation 440, the user interface module 210 may receive a response form the user. The response may include an instruction. The instruction may be related to bidding in an online commerce system and include a bidding price, a max price, a quantity, and a date and time for bidding on the item. The instruction may also be related to a purchase order for purchasing one or more products or services from an entity at a predetermined price.

Figure 5:
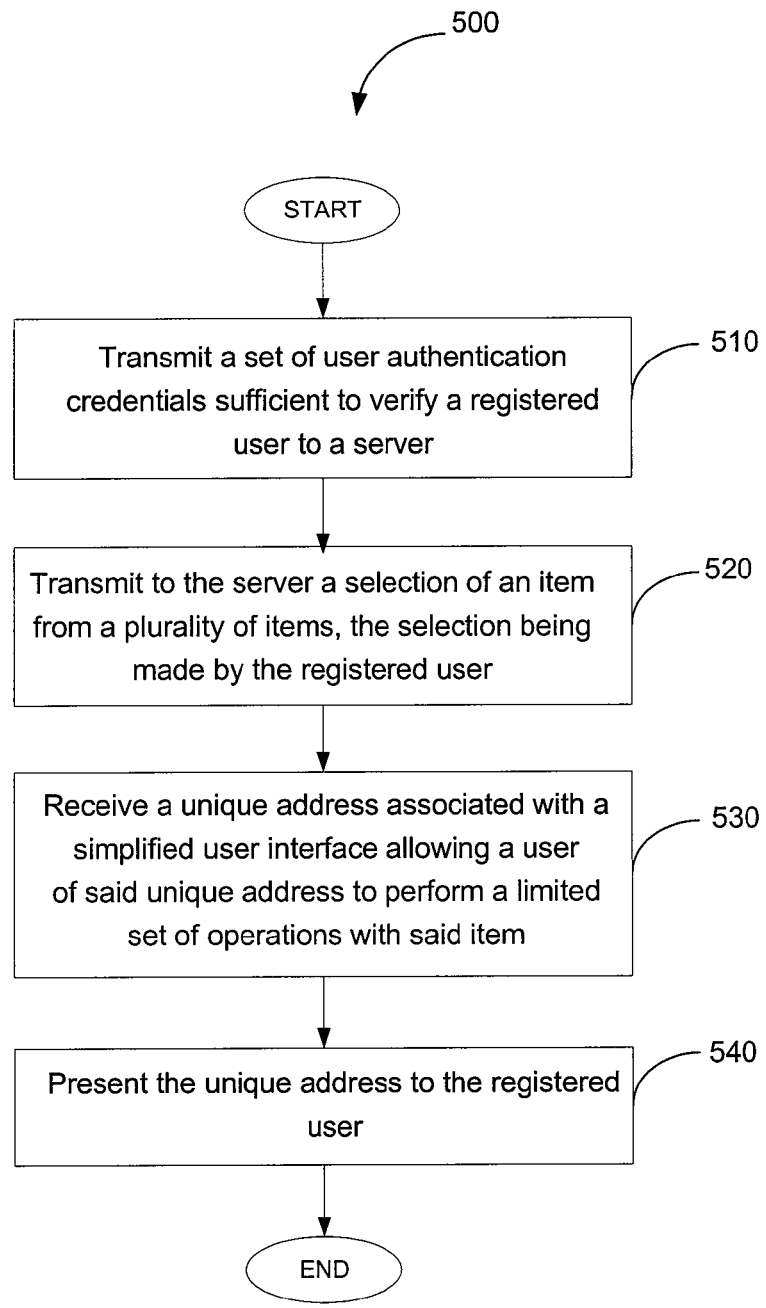
FIG. 5 is a high-level flow diagram illustrating an example method for pre-authenticated online ordering using the client system shown in FIG. 2.

FIG. 5 is a high-level flow diagram illustrating an example method 500 for pre-authenticated online ordering using the client system shown in FIG. 2. At operation 510, the transmitter 320 may transmit a set of user authentication credentials sufficient to verify a registered user of a business entity to the server 130. The authentication credential may have been received from the registered user by the user interface 360. The transmitter 320, at operation 520, may transmit a selection of an item to the server 130. The item may be selected by the registered user from a list of a number of items offered by the business entity.

At operation 530, the receiver 340 may receive from the server 130 a unique address associated with a simplified user interface. The user interface 360 may display the unique address to the registered user at operation 540. The user interface 360 may also show the simplified user interface to the registered user. In an example embodiment, the simplified user interface may allow a user of the unique address to perform a limited set of operations with the item.

Figure 6:
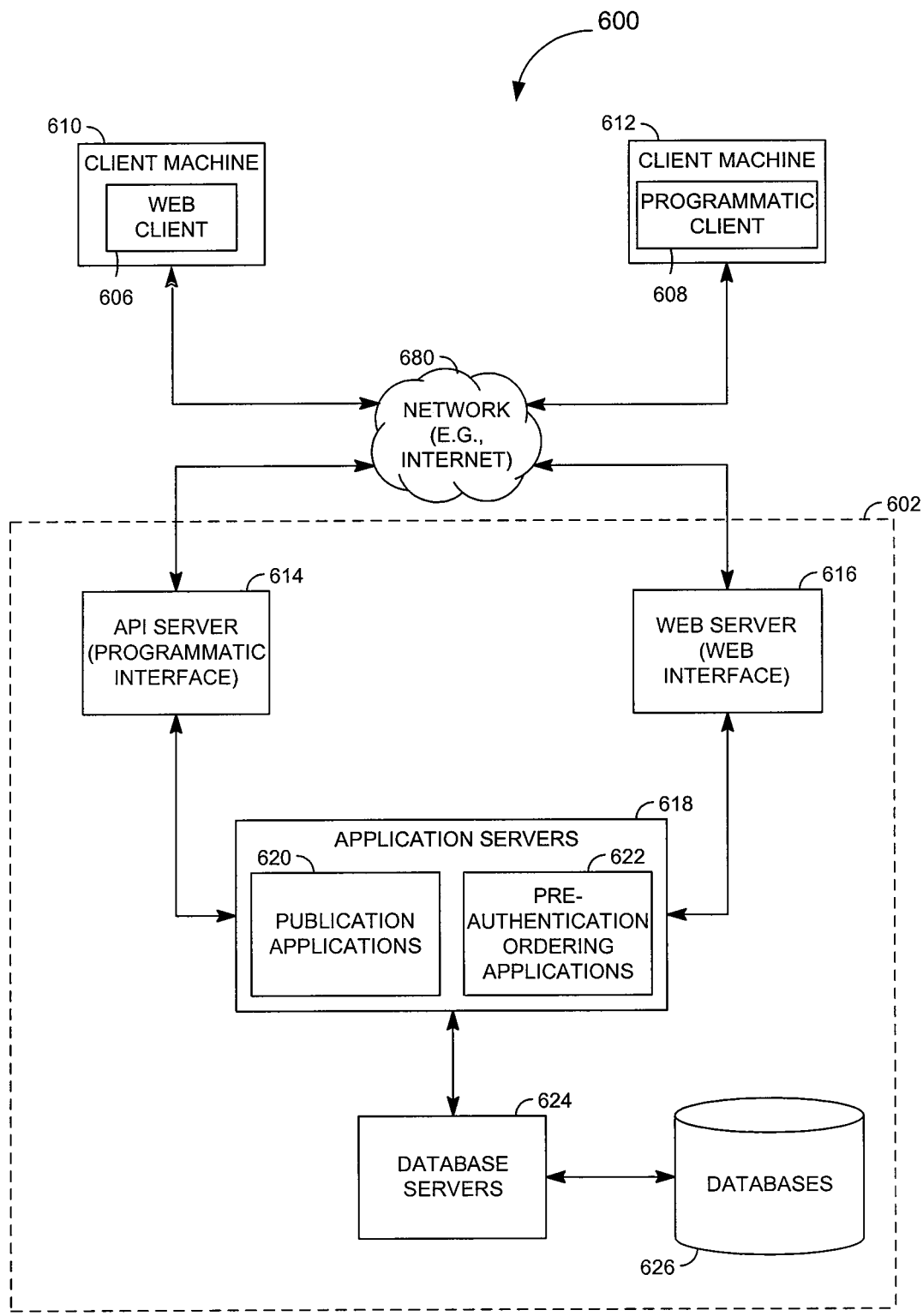
FIG. 6 is high-level block diagram illustrating an example embodiment of a network-based publication system having a client-server architecture and enabled for pre-authenticated online ordering.

FIG. 6 is high-level block diagram illustrating an example embodiment of a network-based publication system 600 enabled for pre-authenticated online ordering and having a client-server architecture. A publication platform, in the example form of a pre-authenticated online ordering server 602, may provide server-side functionality, via a network 680 (e.g., the Internet) to one or more clients. FIG. 6 illustrates, for example, a Web client 606 (e.g., a browser, such as the INTERNET EXPLORER browser developed by Microsoft Corporation of Redmond, Wash.), and a programmatic client 608, executing on respective client machines 610 and 612.

Turning specifically to the pre-authenticated online ordering server 602, an Application Program Interface (API) server 614 and a Web server 616 are coupled to, and provide programmatic and Web interfaces respectively to, one or more application servers 618. The application servers 618 may host one or more publication applications 620 and pre-authenticated ordering applications 622. The application servers 618 are, in turn, shown to be coupled to one or more database servers 624 that facilitate access to one or more databases 626.

The publication applications 620 may provide a number of publication functions and services to users who access the network-based publication system 600. For example, the publication applications may support posting and browsing listings (e.g., items, services, etc.) in the network-based publication system 600. The pre-authenticated ordering applications 622 may facilitate, for a user, online bidding on items or online ordering of items in a pre-authenticated manner, such that the user only authenticates once to receive a unique address (e.g., a URL, or a widget) and uses the unique address without further authentication.

Further, while the network-based publication system 600 shown in FIG. 6 employs a client-server architecture, the disclosed system is not limited to such an architecture and could equally well find application in a distributed, or peer-to-peer, architecture system. The various publication and pre-authenticated ordering applications 620 and 622 could also be implemented as stand-alone software programs, which do not necessarily have networking capabilities.

The Web client 606 may access the publication and pre-authenticated ordering applications 620 and 622 via the Web interface supported by the Web server 616. Similarly, the programmatic client 608 may access the various services and functions provided by the publication and pre-authenticated ordering applications 620 and 622 via the programmatic interface provided by the API server 614. The programmatic client 608 may, for example, be a search application to enable buyers to search for listings of interest to the buyers in the network-based publication system 600. In another example embodiment, the programmatic client 608 may support sellers by facilitating posting of one or more items on the network-based publication system 600.

Figure 7:
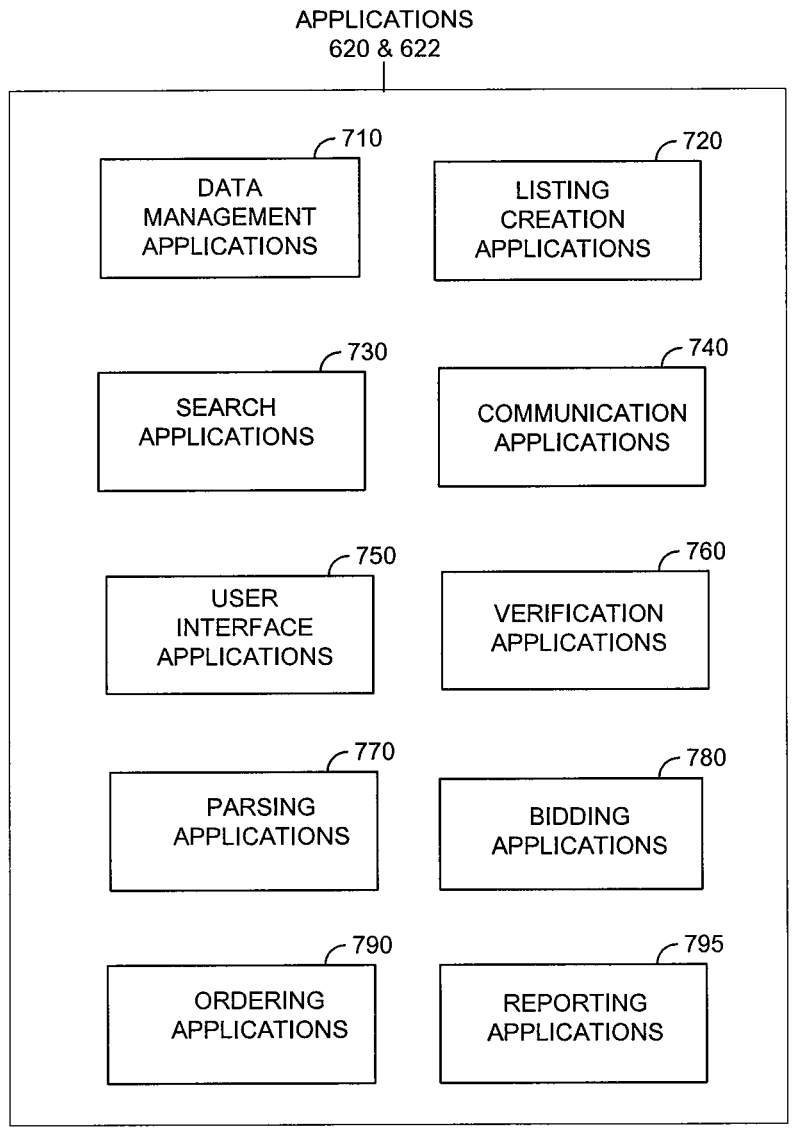
FIG. 7 is an example set of publication and pre-authentication ordering applications used by the network-based publication system of FIG. 6.

FIG. 7 is an example set of publication and pre-authentication ordering applications used by the network-based publication system of FIG. 6. The pre-authenticated online ordering server 602 may provide a number of the publication applications 620 and the pre-authenticated ordering applications 622, whereby a user may post a listing or browse published listings in the network-based publication system 600, and the pre-authenticated online ordering server 602 may support pre-authenticated online bidding on items or the online ordering of items. Various data management applications 710 may provide support for handling data, including storing and retrieving data related to various listings published in the network-based publication system 600. The data management applications 710 may facilitate for the listing data to be categorized according to specific categories based on certain keywords.

A number of listing creation applications 720 may allow sellers of items or posters of advertisements to conveniently author listings pertaining to goods or services that they wish to publish via the network-based publication system 600. The listing creation applications 720 may receive input data provided by the sellers or posters and may have the data management applications 710 store the data in appropriate categories. The listing creation applications 720 may also provide listing information for user interface applications 750 to display the listings to users.

A number of search applications 730 may support searching the databases 626 of the network-based publication system 600 for data items, using search criteria received from a user of the network-based publication system 600. Communication applications 740 may facilitate receiving search criteria from users of the network-based publication system 600.

One or more user interface applications 750 may support the receiving of authentication credentials from registered users of the network-based publication system 600. The user interface applications 750 may also facilitate receiving from the registered user a selection of an item from a list of items offered by the network-based publication system 600. Verification applications 760 may support verification of the authentication credentials entered by the registered users of the network-based publication system 600.

The communications applications 740 may also support communicating a unique address to the registered user. The unique address may be associated with a simplified user interface that allows a user of the unique address to perform a limited set of operations.

Parsing applications 770 may facilitate parsing a response received from a user and retrieving one or more instructions from the response. In some example embodiments, the instructions may include a bidding price for the item, a purchase order for purchasing the item from an online business entity at a predetermined price, or a quantity of the item to bid on or to be purchased.

Bidding applications 780 may support bidding for the item on behalf of the user of the network-based publication system 600. Ordering applications 790 may assist in ordering the item on behalf of the user, based on the instructions received from the user. One or more reporting applications 795 may support reporting to the user information related to results of the bidding on the item or purchasing of the item on behalf of the user.

Machine Architecture

Figure 8:
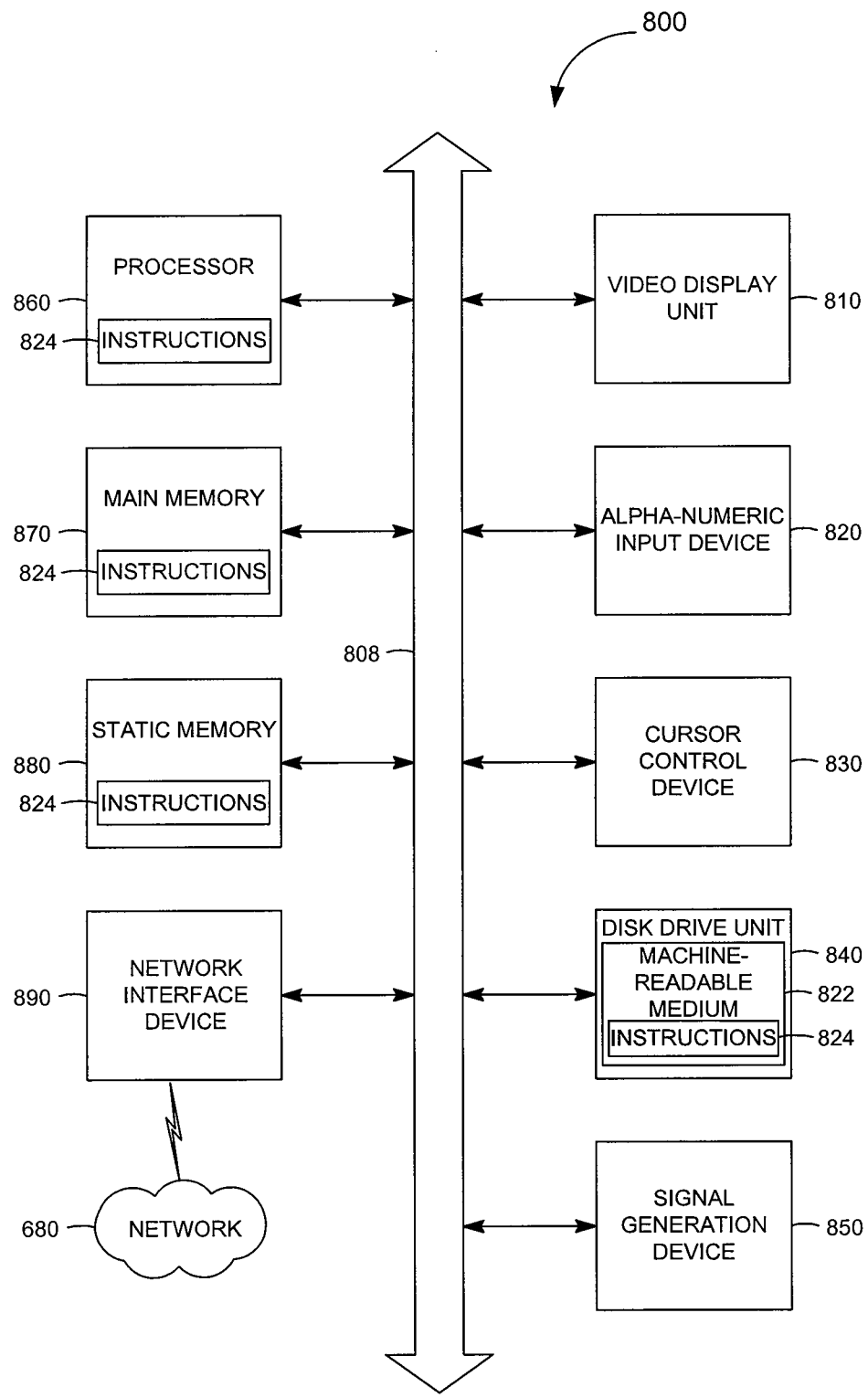
FIG. 8 is a diagram illustrating a diagrammatic representation of a machine in the example form of a computer system.

FIG. 8 is a diagram illustrating a diagrammatic representation of a machine in the example form of a computer system, within which a set of instructions for causing the machine to perform any one or more of the methodologies discussed herein may be executed. In alternative embodiments, the machine 800 may operate as a standalone device or may be connected (e.g., networked) to other machines. In a networked deployment, the machine 800 may operate in the capacity of a server or a client machine in a server-client network environment, or as a peer machine in a peer-to-peer (or distributed) network environment.

The machine 800 may be a server computer, a client computer, a personal computer (PC), a tablet PC, a set-top box (STB), a Personal Digital Assistant (PDA), a cellular telephone, a Web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 860 (e.g., a central processing unit (CPU), a graphics processing unit (GPU), or both), a main memory 870 and a static memory 880, all of which communicate with each other via a bus 808. The computer system 800 may further include a video display unit 810 (e.g., a liquid crystal display (LCD) or cathode ray tube (CRT)). The computer system 800 also may include an alphanumeric input device 820 (e.g., a keyboard), a cursor control device 830 (e.g., a mouse), a disk drive unit 840, a signal generation device 850 (e.g., a speaker), and a network interface device 890.

The disk drive unit 840 may include a machine-readable medium 822 on which is stored one or more sets of instructions (e.g., software 824) embodying any one or more of the methodologies or functions described herein. The software 824 may also reside, completely or at least partially, within the main memory 870, the static memory 880, and/or within the processor 860 during execution thereof by the computer system 800, with the main memory 870 and the processor 860 also constituting machine-readable media.

The software 824 may further be transmitted or received over a network 680 via the network interface device 890.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. The term "machine-readable medium" shall accordingly be taken to include, but not be limited to, solid-state memories and optical and magnetic media.

User Interfaces

Figure 9:
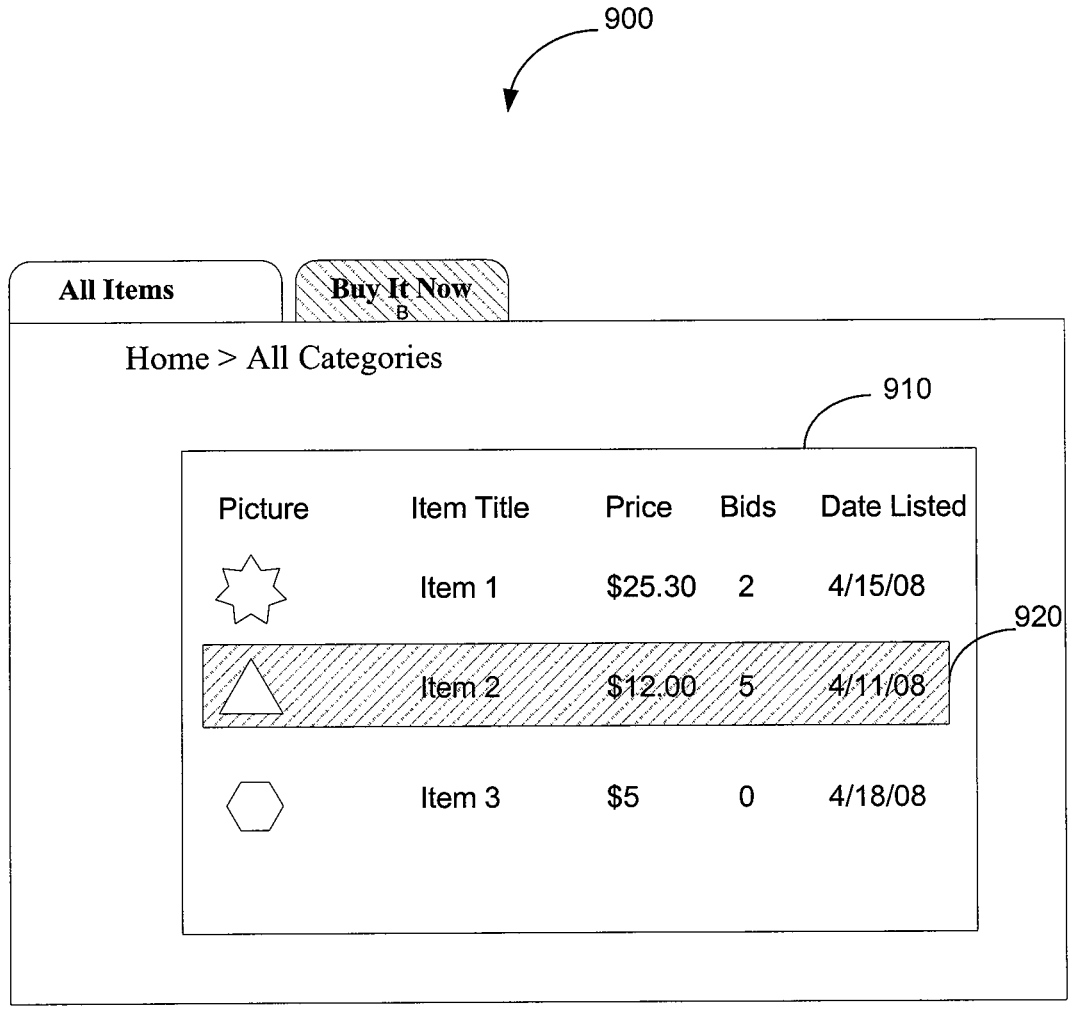
FIG. 9 is a screen shot illustrating an example embodiment of a user interface for selecting an item from a list of items in a pre-authenticated online ordering system.

FIG. 9 is a screen shot illustrating an example embodiment of a user interface 900 for selecting an item from a list of items in a pre-authenticated online ordering system. The user interface 900 may facilitate a selection by a registered user of an item 920 from a list 910 of items offered by an online business entity (e.g., an online commerce system). For each item, the list 910 includes information such as a picture, an item title, a bid price, a number of bids, and a listing date. In an example embodiment, the selection of the item may be made by a mouse click on the picture of the item. Alternatively, the item may be selected by clicking on any other listed information associated with the item.

Figure 10:
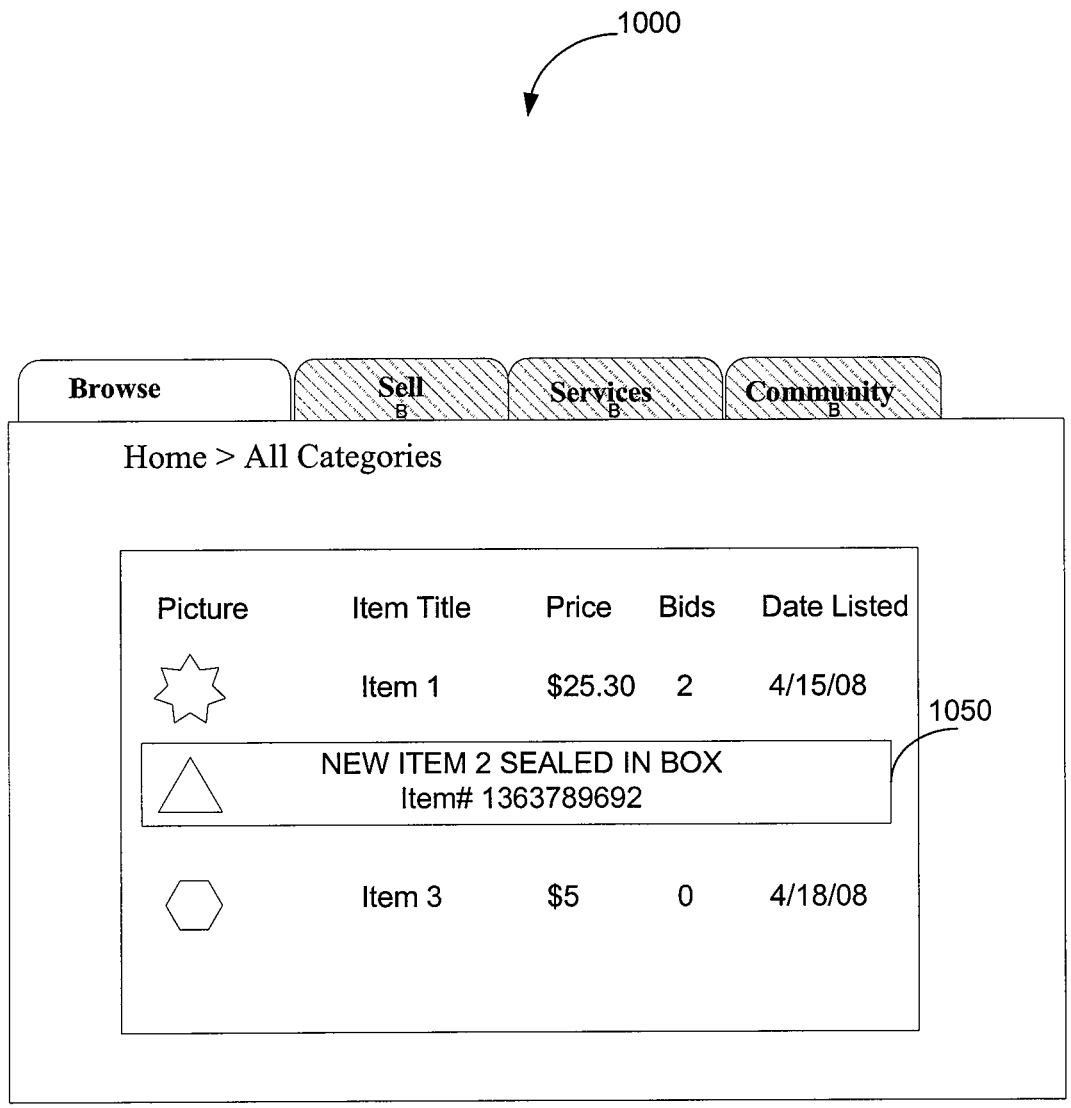
FIG. 10 is a screen shot illustrating an example embodiment of a user interface for displaying an item number associated with the selected item of the user interface of FIG. 9.

FIG. 10 is a screen shot illustrating an example embodiment of a user interface 1000 for displaying an item number associated with the user interface of FIG. 9. After the user makes a selection from the list 910 of FIG. 9, the user interface module 210 (see FIG. 2) may replace the information associated with item 920 in FIG. 9 with new information (see 1050) including an item number. The registered user may make note of the item number or copy the item number into a clipboard.

Figure 11:
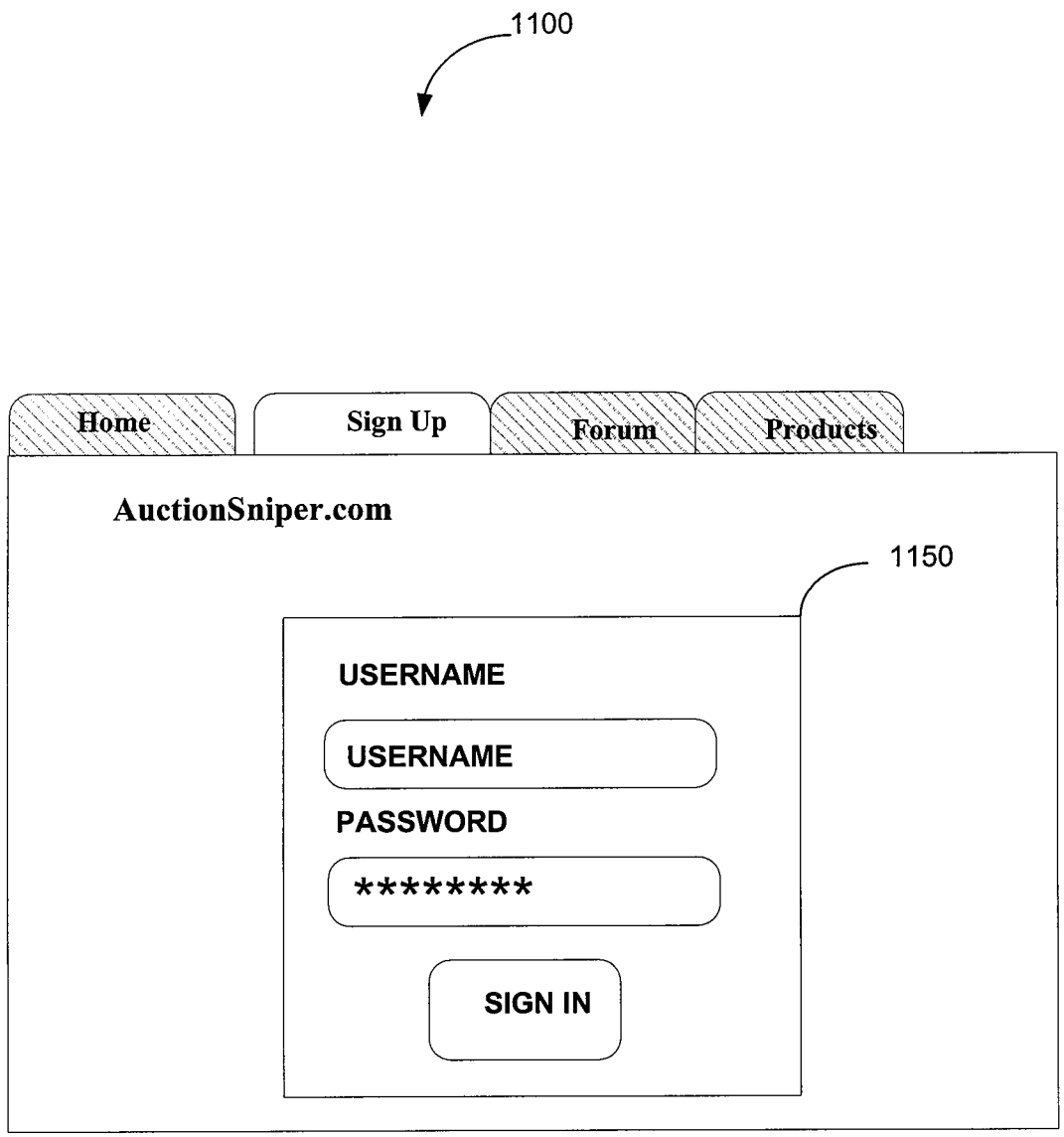
FIG. 11 is a screen shot illustrating an example embodiment of a user interface for receiving a registered user's authentication credentials.

FIG. 11 is a screen shot illustrating an example embodiment of a user interface 1100 for receiving a registered user's authentication credentials. The user interface 1100 allows a registered user to sign in by entering authentication credentials, including a username and password, associated with the registered user in the spaces provided on window 1150. The authentication module 220 (see FIG. 2) may verify the authentication credentials using the stored information associated with the identification of the registered user in the database 280.

Figure 12:
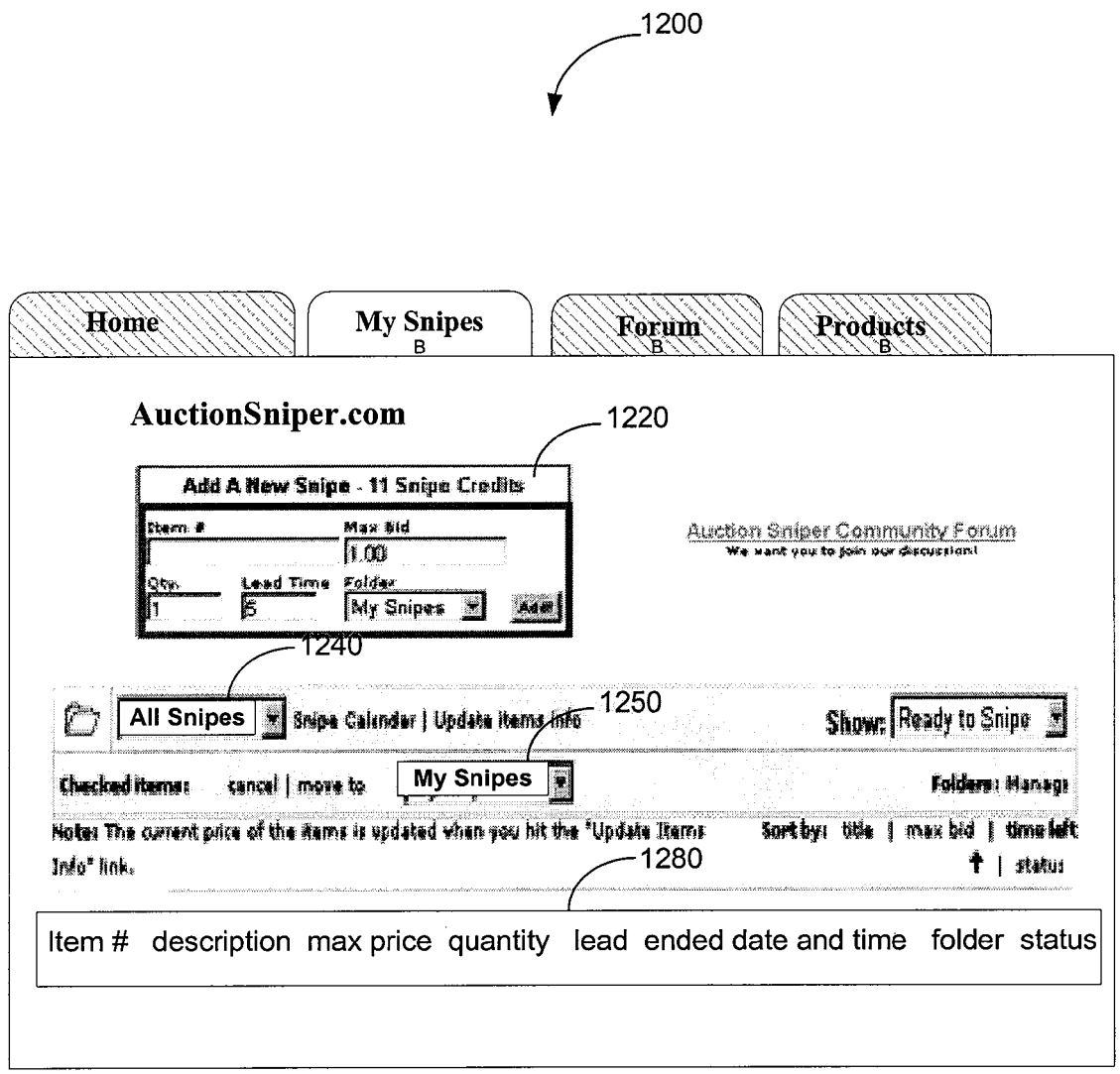
FIG. 12 is a screen shot illustrating an example embodiment of a user interface for receiving a user response that includes instructions.

FIG. 12 is a screen shot illustrating an example embodiment of a user interface 1200 for receiving a user response including instructions. The user may be a registered user of a business entity who has received a unique address (e.g., a URL or a widget) or a third person who has received the unique address from the registered user. The unique address, once activated by the user, may cause the user interface module 210 to display the user interface 1200.

The user interface 1200 may include a portion 1220, where the user may enter the item number copied from the user interface 1000 (e.g., the item number for the item that the user intends to snipe), a maximum bid, a quantity of the item desired, and a lead time indicating the number of seconds before the item end time that the user may want a bid placed for the item. The user may also specify a folder into which the entered information associated with the sniped item may be saved. A drop down box 1240 allows the user to select a folder to review and update information associated with a sniped item. From the drop down box 1250, a user may select a folder from which to move or cancel items. The information associated with the item selected for review may be shown in box 1280.

Thus, a method and a system for pre-authenticated online ordering have been described. Although the present subject matter has been described with reference to specific example embodiments, it will be evident that various modifications and changes may be made to these embodiments without departing from the broader spirit and scope of the subject matter. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computerized method comprising:
   receiving, by a server, a set of user authentication credentials sufficient to uniquely identify a registered user;
   receiving, by the server, from the registered user a selection of an item from a plurality of items; and
   responsive to the receiving of said selection, providing, by the server, a unique address to said registered user, said unique address associated with a user interface, the user interface allowing a further user having access to the unique address to perform a limited set of operations associated with said item without a set of user authentication credentials sufficient to uniquely identify the further user based on the user authentication credentials sufficient to uniquely identify the registered user, the limited set of operations including providing an instruction related to bidding for the item.

2. The computerized method of claim 1, further including verifying the user authentication credentials associated with the registered user.

3. The computerized method of claim 1, further including receiving a response from the further user, the response including the instruction specifying the limited set of operations.

4. The computerized method of claim 3, wherein the further user is at least one of the registered user or a third person who received the unique address from the registered user.

5. The computerized method of claim 3, further including retrieving the instruction from the response.

6. The computerized method of claim 1, wherein the receiving of the selection of the item includes receiving a selection of at least one of a product or a service.

7. The computerized method of claim 6, wherein the product or the service is published by a publication system.

8. The computerized method of claim 1, wherein the providing of the unique address includes providing at least one of a Unique Resource Locator (URL) or a widget.

9. The computerized method of claim 1, wherein the instruction includes at least one of:
   a bidding price for the item,
   a purchase order for purchasing at least one of a product or a service from an entity at a predetermined price, or
   a quantity.

10. The computerized method of claim 9, further including bidding for the item in a commerce system on behalf of the user based on the instruction received from the further user.

11. The computerized method of claim 3, further including executing the instruction, the executing of the instruction including at least one of purchasing of the product or ordering the service on behalf of the further user.

12. The computerized method of claim 11, further including reporting a result to the further user.

13. A system comprising:
   memory; and
   a processor coupled to the memory to:
      cause a user interface module to receive a set of user authentication credentials sufficient to uniquely identify a registered user;
      cause the user interface module to receive from the registered user a selection of an item from a plurality of items;

generate a unique address responsive to the receiving of said selection, said unique address associated with a user interface, the user interface allowing a further user having access to the unique address to perform a limited set of operations associated with said item without a set of user authentication credentials sufficient to uniquely identify the further user based on the user authentication credentials sufficient to uniquely identify the registered user, the limited set of operations including providing an instruction related to bidding for the item; and cause a communication module to communicate the unique address to the registered user.

14. The system of claim 13, further including an authentication module to verify the user authentication credentials associated with the registered user.

15. The system of claim 13, wherein the user interface module is to receive a response from the further user, the response including the instruction specifying the limited set of operations.

16. The system of claim 13, further including a parsing module to retrieve the instruction from the response.

17. The system of claim 13, wherein the instruction includes at least one of a bidding price for the item or a purchase order for purchasing at least one of a product or a service from an entity at a predetermined price.

18. The system of claim 17, further including a bidding module to bid for the item in a commerce system on behalf of the user based on the instruction received from the further user.

19. The system of claim 18, further including an order module to execute the instruction, the execution of the instruction including at least one of purchasing of the product or ordering the service on behalf of the further user.

20. The system of claim 19, further including a reporting module to report a result to the further user.

21. A system comprising:
means for receiving a set of user authentication credentials sufficient to uniquely identify a registered user;
means for receiving from the registered user a selection of an item from a plurality of items; and
means for providing a unique address to said registered user, responsive to the receiving of said selection, said unique address associated with a user interface, the user interface allowing a further user having access to the unique address to perform a limited set of operations associated with said item without a set of user authentication credentials sufficient to uniquely identify the further user based on the user authentication credentials sufficient to uniquely identify the registered user, the limited set of operations including providing an instruction related to bidding for the item.

22. A machine-readable medium comprising instructions, which when implemented by one or more processors perform the following operations:
receiving a set of user authentication credentials sufficient to uniquely identify a registered user;
receiving from the registered user a selection of an item from a plurality of items; and
responsive to the receiving of said selection, providing a unique address to said registered user, said unique address associated with a user interface, the user interface allowing a further user having access to the unique address to perform a limited set of operations associated with said item without a set of user authentication credentials sufficient to uniquely identify the further user based on the user authentication credentials sufficient to uniquely identify the registered user, the limited set of operations including providing an instruction related to bidding for the item.

23. The machine-readable medium of claim 22, wherein the operations further include receiving a response from the further user, the response including the instruction specifying the limited set of operations the instruction including at least one of a bidding price for the item, a purchase order for purchasing at least one of a product or a service from an entity at a predetermined price, or a quantity.

24. The machine-readable medium of claim 23, wherein the operations further include:
bidding for the item in a commerce system on behalf of the further user;
executing the instruction, the execution of the instruction including specifying the limited set of operations including at least one of purchasing of the product or ordering the service on behalf of the further user; and
reporting a result to the further user.

25. A computerized method comprising:
transmitting, by a transmitter, a set of user authentication credentials sufficient to uniquely identify a registered user to a server;
transmitting, by the transmitter, to the server a selection of an item from a plurality of items, the selection being made by the registered user;
responsive to the transmitting of said selection, receiving, by a receiver, a unique address associated with a user interface, the user interface allowing a further user having access to the unique address to perform a limited set of operations associated with said item without a set of user authentication credentials sufficient to uniquely identify the further user based on the user authentication credentials sufficient to uniquely identify the registered user, the limited set of operations including providing an instruction related to bidding for the item; and
presenting, via a display unit, the unique address to the registered user.

26. The computerized method of claim 25, further including transmitting a response from the further user, the response including the instruction specifying the limited set of operations.

27. The computerized method of claim 25, wherein the instruction includes at least one of:
a bidding price for the item,
a purchase order for purchasing at least one of a product or a service from an entity at a predetermined price, or
a quantity.

28. A system comprising:
a transmitter to transmit a set of user authentication credentials sufficient to uniquely identify a registered user to a server;
the transmitter to transmit to the server a selection of an item from a plurality of items, the selection being made by the registered user;
a receiver to receive, responsive to the transmitting of said selection, a unique address associated with a user interface, the user interface allowing a further user having access to the unique address to perform a limited set of operations associated with said item without a set of user authentication credentials sufficient to uniquely identify the further user based on the user authentication credentials sufficient to uniquely identify the registered user, the limited set of operations including providing an instruction related to bidding for the item; and
a display unit to present, via a user interface, the unique address to the registered user.

29. The system of claim 28, wherein the transmitter is to transmit a response from the further user to the server, the response including the instruction specifying the limited set of operations and including at least one of:
- a bidding price for the item,
- a purchase order for purchasing at least one of a product or a service from an entity at a predetermined price, or
- a quantity.

\* \* \* \* \*